United States Patent Office 3,795,538
Patented Mar. 5, 1974

3,795,538
PROCESS FOR LUBRICATING ORGANIC
AND INORGANIC FIBERS
John Idris Evans, Penarth, and Ann Margaret Parry,
Edgbaston, England, assignors to Midland Silicones
Limited, Berkshire, England
No Drawing. Original application June 13, 1968, Ser. No.
736,604, now abandoned. Divided and this application
Oct. 1, 1971, Ser. No. 185,847
Int. Cl. C08j 1/44; D06m 15/66
U.S. Cl. 117—139.5 A    8 Claims

ABSTRACT OF THE DISCLOSURE

A process for lubricating organic and inorganic fibers comprising applying to the fibers an aqueous diorganopolysiloxane emulsion.

---

This application is a division of application Ser. No. 736,604, filed June 13, 1968, now abandoned.

This invention relates to a process for the preparation of aqueous emulsiois of organopolysiloxanes and to the use of such emulsions as fiber lubricants.

During the processing and spinning of inorganic and organic fibers, lubricants are often applied to the fibers to reduce friction between the fibers, which can be in the form of threads and yarns, and the processing machinery, thereby facilitating the various processing operations such as spinning, weaving and sewing. Emulsions of mineral oils have been employed as lubricants in this manner but they have in many cases been superseded in this appliation by aqueous emulsions of diorganopolysiloxanes. Although such emulsions have been widely employed, the lubrication imparted by them has not proved entirely adequate in all cases and there has consequently existed a need for an improved diorganopolysiloxane emulsion for application as a fiber finish.

According to this invention, we have now found that an improved fiber lubricating composition may be obtained if an aqueous emulsion of a diorganopolysiloxane is prepared in a novel and specific manner.

Accordingly, this invention provides a process for the preparation of an aqueous diorganopolysiloxane emulsion composition comprising emulsifying in water a diorganopolysiloxane having a viscosity within the range of about 350 to 70,000 cs. at 25° C., wherein at least 50 percent of the total silicon-bonded organic radicals are methyl radicals and therein mixing the emulsion obtained with a water-miscible aliphatic solvent or a water-miscible aliphatic solvent-water mixture.

This invention further includes a process wherein the emulsion is applied to an organic or inorganic fiber.

The diorganopolysiloxanes employed in the preparation of the emulsions of this invention are those containing two or preferably from 1.95 to 2.05 organic radicals per silicon atom of which at least 50 percent of the total organic radicals being methyl radicals. Any remaining radicals in the diorganopolysiloxane are preefrably monovalent aliphatic or aromatic hydrocarbon radicals, such as alkyl radicals, ethyl, propyl, hexyl or octadecyl radicals, alkenyl radicals such as vinyl, allyl and cyclohexeneyl radicas and aryl radicals such as phenyl, naphthyl and tolyl radicals. If desired, up to about 10 percent of the total radicals present can be monovalent substituted hydrocarbon radicals, like halogenohydrocarbon radicals, amino-substituted hydrocarbon radicals or hydrocarbon radicals substittued with sulphate or hydroxyl radicals.

The diorganopolysiloxane can vary in viscosity from freely flowing liquids to gummy solids. The preferred diorganopolysiloxanes for use in preparing fiber lubricating emulsions according to this invention are the dimethylpolysiloxanes. Preefrably also the diorganopolysiloxane has a viscosity within the range from 350 to 70,000 cs. at 25° C.

When carrying out the process of this invention, the diorganopolysiloxane is first emulsified in water and the emulsifying step is best carried out with the aid of an emulsifier. A variety of materials capable of performing as emulsifiers for diorganopolysiloxanes are known and can be employed. Such materials include the condensation products of ethylene oxide with fatty acids, or alcohols, such as the trimethynnonyl ether or polyethylene glycol, the monostearic acid ester of polyethylene glycol and polyoxyethylated derivatives of oleic acid, sodium salts of alkylated aryl polyether sulphates, soribtan monostearate, and polyvinyl alcohol. Preferred as the emulsifying agents are the common non-ionic materials such as the ethylene oxide condensation products.

The relative proportions of the diorganopolysiloxane, water and emulsifying agent used during the emulsification step can vary widely depending on the type of emulsifier, the nature of the diorganopolysiloxane and the desired siloxane content in the final emulsion. Preferably, the emulsification step is carried out with relative proportions of water and diorganopolysiloxane which provide an emulsion having a siloxane content greater than that desired in the final product, sufficient water being subsequently added with the alcohol or ketone to adjust the siloxane content to the desired proportion. For example, when it is desired to prepare a composition according to this invention containing 30 to 40 percent of the diorganopolysiloxane, it can conveniently be obtained by emulsifying the diorganopolysiloxane in about 20 to 50 percent of its weight of water, thereafter combining the emulsion with the alcohol and sufficient additional water to give the desired concentration of siloxane in the composition. However, the emulsion can be prepared if desired having relative proportions of diorganopolysiloxane and water comensurate with obtaining the desired composition without subsequent addition of water.

Any water-miscible aliphatic monohydric alcohol such as methyl alcohol, ethyl alcohol or isopropyl alcohol or water miscible aliphatic ketone such as acetone can be employed to prepare emulsions according to the process of this invention, ethyl alcohol normally being preferred. The proportion of alcohol or ketone used is not narrowly critical. Depending on the nature of the siloxane and the particular alcohol or ketone generally from about 0.1 to about 1 part by weight of alcohol or ketone for every part by weight of water in the final emulsion is sufficient.

For maximum stability of the emulsion, formation of the emulsion is best carried out with the aid of a mechanical homogenizer, such as a colloid mill. If desired, a mechanical homogenizer can be employed in the step involving mixing of the emulsion and the alcohol and/or ketone and, where appropriate, water. The use of such equipment at this stage is not essential in that a stable composition can be obtained by stirring the components together. It is also preferred, for reasons of stability of the emulsion, to admix the emulsion and the alcohol or ketone, by adding the latter to the former and to add the alcohol and/or the ketone as a solution in water to the diorganopolysiloxane emulsion.

In addition to the specified essential components, the compositions of this invention can also contain any of the additives commonly employed in aqueous emulsions, for example, preservatives and corrosion inhibitors. In particular, it has been found that the incorporation of sodium benzoate in the emulsion is especially useful in minimizing the corrosion of steel equipment with which the emulsions can come into contact.

The compositions prepared according to the process of this invention are in general stable emulsions and are of particular utility as lubricants for a wide variety of organic and inorganic fibers such as those made from nylon, polyethylene trephthalate, polyethylene, polypropylene or glass. It has been found that when applied to such fibers the compositions prepared according to this invention are, in general, superior in their lubricating properties to emulsions prepared by more conventional techniques.

Any suitable method for example lick roller, spraying or immersion can be employed for applying the emulsion to the fiber which can be treated in any desired form as a monofilament, thread or yarn. The proportion of diorganopolysiloxane in the applied emulsion can vary widely depending on the desired pick-up of siloxane by the fiber. Preferably, the applied emulsion contains from 5 to 35 percent by weight of the diorganopolysiloxane.

In addition to their use as fiber lubricants, the emulsions of this invention also find application as mold release agents and antifoams.

The invention is illustrated by the following examples in which the quantities are expressed as parts by weight.

EXAMPLE 1

35 parts of a trimethylsilyl end-stopped dimethylpolysiloxane oil having a viscosity of 1,000 cs. at 25° C. were emulsified in a solution of 1.5 parts of a polyoxyethylene oleyl ether (containing 20 oxyethylene units) and 0.1 part of sodium benzoate in 10.0 parts of water. This primary emulsion was passed through a colloid mill and then diluted by the addition thereto separately of 16 parts of ethyl alcohol and 37.4 parts of water. The resulting mixture was then passed through the colloid mill.

Nylon thread (tow spun 130/3) was coated by immersion in the emulsion such that the measured siloxane pick-up of the thread after drying was 1.5 percent by weight. The treated thread was then tested for its frictional characteristic against a steel spindle. During the test the thread was pulled over the spindle at 5000 cm. per minute. The difference in tension in the thread before and after passing over the spindle was measured by means of two transducers to give a relative measure of the frictional force between the thread and the spindle. This measure of the frictional force was expressed as number, the higher numbers indicating the higher frictional forces.

The experiment was also performed for comparative purposes on nylon thread which had been treated with a conventional emulsion of a polydimethylsiloxane of 1000 cs. viscosity at 25° C.

For the nylon thread treated with the emulsion of this invention, the relative friction number obtained was 18 whereas a value of 22 was obtained for thread treated with the conventional emulsion.

EXAMPLE 2

35 parts of a trimethylsilyl end-stopped dimethyl-polysiloxane having a viscosity of 12,500 cs. at 25° C. was mixed at 70° C. with 1.2 parts of a polyoxyethylene oleyl alcohol (containing 3 oxyethylene units) and 0.3 part of a polyoxyethylene oleyl ether (containing 20 oxyethylene units) and 15 parts of water and the mixture homogenized after cooling by passage through a colloid mill. To this emulsion was added, with stirring, a solution containing 16 parts of industrial methylated spirits, 0.1 part of sodium benzoate, 0.1 part of a proprietary bactericide and 32 parts of water. The resulting product was a stable emulsion which was tested for its fiber lubricating properties by the method described in Example 1. In the test the emulsion was applied to staple spun polyester, tow spun nylon and continuous filament nylon. In each case, effective lubrication of the fiber was achieved, the results in respect of the tow spun nylon being superior to those obtained with the emulsion prepared in Example 1.

EXAMPLE 3

Emulsions were prepared by the method described in Example 2 except that dimethylpolysiloxanes were employed having viscosities of 30,000 and 60,000 cs. respectively at 25° C.

In each case, a stable emulsion was obtained which was superior in its fiber lubricating properties to a conventionally prepared emulsion.

EXAMPLE 4

An emulsion was prepared as in Example 2 except that the industrial methylated spirit was replaced with an approximately equal quantity of acetone. The resulting product was an effective lubricant for tow spun nylon.

That which is claimed is:

1. A process for treating organic and inorganic fibers comprising applying thereto an aqueous diorganopolysiloxane emulsion composition prepared by (1) emulsifying in water with the aid of an emusifying agent, an organopolysiloxane having a viscosity within the range of about 50 to 70,000 cs. at 25° C. and from 1.95 to 2.05 organic radicals per silicon atom, wherein at least 50 percent of the total bonded organic radicals are methyl radicals, and any remaining organic radicals are monovalent aliphatic or aromatic hydrocarbon radicals, the amount of water employed comprising 20 to 50 percent by weight of the organopolysiloxane, and thereafter (2) mixing the emulsion obtained with a water-miscible aliphatic solvent selected from (a) monohydric alcohols
(b) ketones or
(c) mixtures thereof to provide in the mixture from 0.1 to 1 part of the water miscible solvent for every part of water therein.

2. A process for treating organic and inorganic fibers in accordance with claim 1 wherein the aqueous diorganopolysiloxane emulsion contains a monohydric alcohol as the water miscible solvent.

3. A process for treating organic and inorganic fibers in accordance with claim 1, wherein the aqueous diorganopolysiloxane emulsion contains a ketone as the water miscible solvent.

4. A process for treating organic and inorganic fibers accordance with claim 1, wherein the aqueous diorganopolysiloxane emulsion contains ethyl alcohol as the water miscible solvent.

5. A process for treating organic and inorganic fibers in accordance with claim 1 wherein the emulsifying agent is an ethyleneoxide condensation emulsifying agent.

6. A process for treating organic and inorganic fibers in accordance with claim 1 wherein the water-miscible aliphatic solvent is employed in a proportion of from 0.1 to 1 part by weight for every part by weight of water in the composition.

7. A process for treating organic and inorganic fibers in accordance with claim 1 wherein the diorganopolysiloxane is a dimethylpolysiloxane.

8. A process as claimed in claim 1 wherein the water-miscible solvent (2) is incorporated as a water solution.

References Cited

UNITED STATES PATENTS

| | | | |
|---|---|---|---|
| 3,251,794 | 5/1966 | Paliyenko et al. | 117—161 ZA |
| 3,423,235 | 1/1969 | Campbell | 117—139.5 A |
| 3,653,955 | 4/1972 | Habib | 117—139.5 A |
| 3,493,425 | 2/1970 | Campbell | 117—139.5 A |
| 2,588,365 | 3/1952 | Dennett | 117—161 ZA |
| 2,491,843 | 12/1949 | Wilcock | 260—448.2 R |
| 2,755,194 | 7/1956 | Volkmann et al. | 117—161 ZA |
| 3,009,833 | 11/1961 | Somerville | 117—161 ZA |
| 2,385,423 | 9/1945 | Seymour et al. | 117—139.5 X |
| 2,857,330 | 10/1958 | Hall | 117—139.5 CQ |

WILLIAM D. MARTIN, Primary Examiner

T. G. DAVIS, Assistant Examiner

U.S. Cl. X.R.

117—126 GS, 138.8 E, 138.8 F, 138.8 N